United States Patent [19]
Hansen

[11] Patent Number: 5,865,869
[45] Date of Patent: *Feb. 2, 1999

[54] SOLUTION FOR PLANT ROOT WATERING

[75] Inventor: Ronald P. Hansen, New South Wales, Australia

[73] Assignee: Ecologel USA, Inc., Ocala, Fla.

[ * ] Notice: The term of this patent shall not extend beyond the expiration date of Pat. No. 5,814,123.

[21] Appl. No.: 514,128

[22] Filed: Aug. 11, 1995

Related U.S. Application Data

[63] Continuation-in-part of Ser. No. 970,546, Nov. 2, 1992, which is a continuation of Ser. No. 739,455, Aug. 2, 1991, abandoned.

[51] Int. Cl.$^6$ .................................................. C05F 11/00
[52] U.S. Cl. ................... 71/11; 47/9; 71/27; 71/64.08; 71/64.1
[58] Field of Search .................. 71/64.1, 64.08, 71/11, 27; 47/9, 58, 59, 62

[56] References Cited

U.S. PATENT DOCUMENTS

| | | | |
|---|---|---|---|
| 3,600,852 | 8/1971 | Burke et al. | 47/9 |
| 4,353,949 | 10/1982 | Kyminas et al. | 428/195 |
| 4,389,394 | 6/1983 | Drucker | 424/53 |
| 4,702,496 | 10/1987 | Hume, III | 281/15 R |
| 5,082,500 | 1/1992 | Machtman et al. | 47/9 |
| 5,422,352 | 6/1995 | Astrup | 514/264 |
| 5,614,008 | 3/1997 | Escano et al. | 106/23 D |

FOREIGN PATENT DOCUMENTS

| | | | |
|---|---|---|---|
| 177226 | 4/1986 | European Pat. Off. | 47/9 |
| 3431565 | 3/1985 | Germany | 47/9 |
| 1-289419 | 11/1989 | Japan | 47/9 |
| 5-227836 | 9/1993 | Japan | 47/9 |
| 605586 | 5/1978 | Russian Federation | 47/9 |

*Primary Examiner*—Wayne Langel
*Attorney, Agent, or Firm*—Pendorf & Cutliff

[57] ABSTRACT

Improved solutions for watering plant roots and methods of application, the solutions containing in parts by volume (1) humectant from 25 to 75, (2) thickener from 0.2 to 1.5, (3) binder from 0.2 to 5, (4) wetting agent from 0.2 to 2.0 and (5) water 75 to 25.

10 Claims, 1 Drawing Sheet

SOLUTION FOR PLANT ROOT WATERING

This is a Continuation-in-Part of application Ser. No. 07/970,546 filed Nov. 2, 1992 pending, which is a Continuation of application Ser. No. 07/739,455 filed Aug. 2, 1991, abandoned.

BACKGROUND OF THE INVENTION

1. Summary of the Invention

This invention relates to improved solutions for watering plant roots and methods of application, and more particularly, to water soluble solutions for application to grass and other root bearing plants, the solutions including a humectant as its principle constituent and also as additives so that during humid evenings the humectant will act to collect moisture and during hot days the humectant will act to release the collected moisture for feeding the plant roots thereadjacent.

2. Description of the Background Art

In conditions of water scarcity and/or high evaporation loss rates due to high temperatures, low humidity, high winds, etc., soil loses water rapidly. Moisture in the soil is drawn to exposed soil surfaces by capillary action thereby replacing the moisture lost by evaporation into the air. At the same time, moisture drawn from the soil into plant root fibers by osmosis is transpired through the plant stems and leaf systems, and that fraction not converted by photosynthesis is then lost by evaporation from pores of leaf surfaces. Soil can quickly become dehydrated to very low moisture content.

The survival of plants in such conditions thus depends on the amount of soil moisture which is accessible to the plant root systems. This is that fraction of the total soil moisture remaining after losses via the capillary/evaporative process. Since the evaporative losses mean soils are driest near the surface, plants with shallow root systems such as grasses and other small species, are affected more rapidly than deep-rooted plants such as trees, etc.

Where there is a marked change in ground temperatures between day and night, there is a significant air inhalation into porous soils during the night-time cooling (contraction) cycle and exhalation of air and moisture in the heat of the day. This further aggravates the overall evaporative moisture loss.

The invention described herein reduces the losses of moisture from direct evaporation, improves the proportion of soil moisture accessible to plants, and in certain conditions prevents or even reverses the evaporative loss from day/night movement in and out of porous soils.

Commercially available chemical compositions, the literature and patents disclose many compositions and methods for treating plant roots. Note, for example, U.S. Pat. Nos. 3,798,838 to Hashimoto; 4,063,919 to Grano; 4,380,886 to Koslow; 4,469,502 to Heller, and 4,540,427 to Helbling.

The patent to Hashimoto discloses fertilization and irrigation of highly permeable surface soils in semi-arid regions wherein the soils are contacted with an aqueous solution of a water soluble plant nutrient salt and an effective amount of a partially hydrolyzed polyacrylamide to reduce the permeability of the soil without rendering it impermeable to water flow. It has been found that water soluble plant nutrients and the aforementioned partially hydrolyzed polyacrylamide exhibit a synergistic effect to decrease the water permeability of the soils. It has also been found that plants grow better in the treated soil and are more efficient in uptake of nutrients from the soil. These discoveries can be used to conserve water and fertilizer and improve the efficiency of agronomy by contacting the soil with a solution having a concentration of from 0.001 to about 1 weight percent of a polyacrylamide having from 5 to about 80 percent of its amide groups hydrolyzed to carboxylic acid groups and from 0.001 to 5 weight percent of a water soluble, plant nutrient salt.

The patent to Grano relates to a fertilizer rod composition comprising about 100 parts of a polyvinyl alcohol, about 0 to 20 parts of a plasticizer and about 10 to 350 parts of a fertilizer, a process for producing such rod and a product of such process.

The Koslow patent describes a method of promoting the transport of water through medium and coarse grained soils comprising the step of applying to the medium or coarse grained soil a soil amendment composition at a level of less than 20 parts per million parts by weight of dry soil, and preferably less than 5 ppm. The composition comprises a substantially linear, substantially water-soluble hydrophilic polymer having a molecular weight greater than 50,000. A preferred polymer is poly (ethylene oxide) having a molecular weight of 300,000 to 7,000,000.

The Heller patent discloses a process for supplying plants with nutrients uniformly and over a long period of time by the addition of nutrient-charged synthetic resin ion exchangers and mineral fertilizers to the culture medium, according to which the nutrient-charged synthetic resin ion exchangers are employed together with those mineral fertilizers with particle size less than 500 $\mu$m which have been coated with massive polyurethanes having a particular water absorbing capacity which is adapted in a particular manner to the water solubility of the mineral fertilizer; furthermore, fertilizers containing nutrient-charged synthetic resin ion exchangers, and the mineral fertilizers coated with the massive polyurethanes having a particular water absorbing capacity.

The Helbling patent discloses a method for improving the water conservation properties of soil. The method increases the ability of the soil to absorb and retain water and acts to stabilize the loosening of break-up of the soil.

In addition, the Merck Index discloses the use of sorbitol and other substances as humectants.

No prior art composition or method of application provides the objects and advantages of the present invention.

It has now surprisingly been found that humectants in aqueous solutions with an appropriate wetting agent function extremely well in improving the watering of plant roots.

It is therefore an object of this invention to provide improved solutions for watering plant roots and methods of application, the solutions containing in parts per volume (1) humectant from 25 to 75, (2) thickener from 0.0 to 1.5, (3) binder from 0.0 to 5, (4) wetting agent from 0.0 to 2.0 and (5) water 75 to 25.

It is a further object of the invention to water lawns and other plant root systems with the aid of a humectant.

It is a further object of the invention to utilize chemical solutions to entrap moisture, then release such entrapped moisture for watering the roots of plants.

It is a further object of the invention to foster ecological objectives by reducing the consumption of water for plant maintenance.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

For the purpose of summarizing this invention, this invention may be incorporated into improved solutions for watering plant roots and methods of application, the solutions containing in parts by volume (1) humectant from 25 to 75, (2) thickener from 0.0 to 1.5, (3) binder from 0.0 to 5, (4) wetting agent from 0.0 to 2.0 and (5) water 75 to 25.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other chemical compositions and methods for carrying out the same purposes of the present invention. It should also be realized by those skilled in the art that such equivalent compositions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
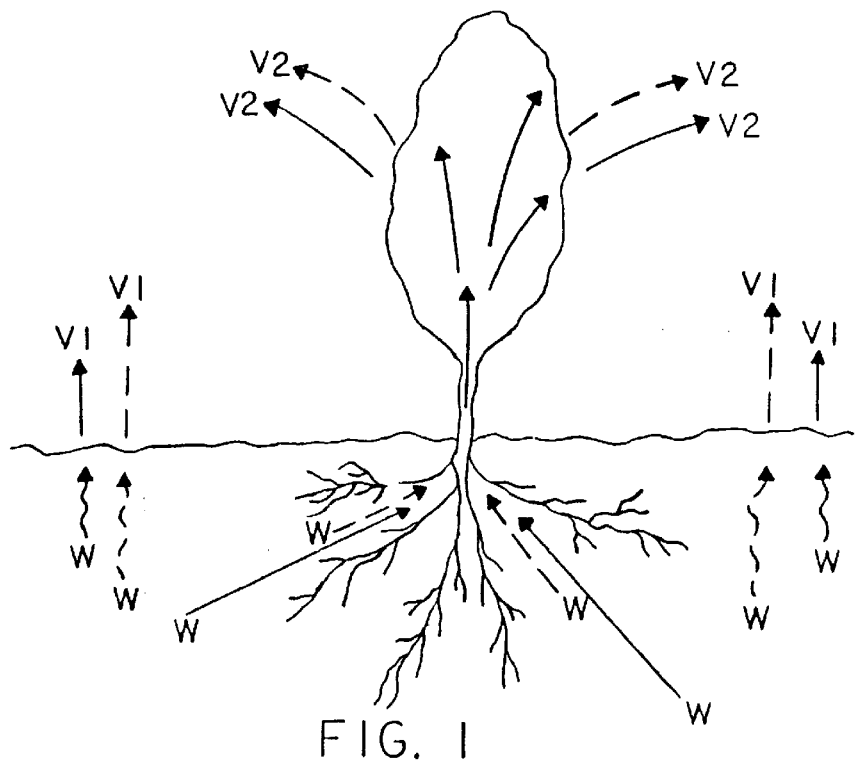
FIG. 1 is a sectional view of a plant in soil illustrating a normal and an improved cycle of moisture for watering such plant.

Many substances are effective to function as a humectant. A humectant has the particular property of tending to maintain a constant humidity in air which is in contact with a saturated solution of such humectant. At a given temperature, such a solution will emit moisture into air where the relative humidity is below the characteristic equilibrium point for that substance. Such solution will also extract moisture from air at higher humidities. For the purposes of this application, humectant is defined as a substance which absorbs moisture easily at certain humidity levels and reduces the rate of moisture transmission out of the treated substance.

Each such humectant or mixture of substances containing a humectant has a characteristic humidity equilibrium point.

Certain organic substances, including some glycols and polyhydric alcohols such as glycerol and sorbitol, have similar humectant effects and humidity equilibrium points. As a result, solutions of them will inhibit evaporation to, and absorb moisture from, air at relative humidities above their equilibrium points.

Organic humectants constitute a class of materials well known in the art. An organic humectant is a member of a group of materials which attracts and releases moisture under varying humidity conditions ("ICI Specialty Chemicals 1990 Product Guide," page 2 (of record); *Hacks Chemical Dictionary*). The term "humectant" as used herein is consistent with the use of the term in U.S. Pat. No. 3,820,976 to Wells et al. which claims a slow release *soli* fumigant comprising a mixture of fumigant, a protective colloid and a humectant in water. Examples of humectant are provided.

A wetting agent is optional, and facilitates the ability of a dry material to dissolve in or take up water.

A thickener is optional, and is used to effect the rheological properties of a solution.

A binder is optional, and helps the humectant bind to soil or to a plant root.

The above terms have the same meaning as in U.S. Pat. Nos. 4,752,319 and 4,624,694 to DelliColli which teach a method of crop seed treatment. DelliColli claims a seed having adhered thereto a composition formed by adding, to an aqueous slurry of a water-insoluble alkali lignin, a member of the group consisting of a humectant, a wetting agent, a dispersing agent, an antifreeze agent, and mixtures thereof.

These terms are also consistent with U.S. Pat. No. 5,005,345 to Gill which claims accelerating decomposition by the steps of: separating straw from grain, crushing the straw, applying a nutrient solution containing a humectant selected from the group consisting of molasses, dextrose, malt extract, and invert sugar to the straw, and distributing the straw on the field.

Further, U.S. Pat. No. 4,047,925 to Barer employs "surface active agents" which has the same meaning as "surfactant" or "wetting agent." U.S. Pat. No. 4,847,078 to Sheppard et al. teaches a composition including thickeners and surfactants.

The disclosures of the above patents are incorporated herein by reference.

Previously, it had been expected that a watering solution must contain at least a humectant, a thickener, a binder, and optionally a wetting agent. It has now been surprisingly discovered that formulations can be prepared without a thickener, thus saving in cost. It has further been found that some formulations without thickener have synergistic humectant properties. Accordingly, in its simplest form, the formulation of the present invention comprises a humectant, a binder, and water.

In particular, it has been found that potassium lactate is a powerful hygroscopic, particularly when used with sorbitol. Preferred include lignosite or calcium lignosulfonate as the binder. WAFEX Powder is one commercially available form of calcium lignosulfonate, and has a residual wood-sugar fraction. WAFEX powder has both binding and surfactant properties and is also a humectant. It has almost no thickening or binding properties.

As wetting agent, teric surfactant is preferred. Although calcium nitrate has almost no thickening or binding properties, it adds noticeably to the humectant action of the humectant of the formulation, and has a particularly strong action when blended with sorbitol and calcium lignosulfonate, enhancing the moisture retention effect.

Other preferred wetting agents include octylphenol ethoxylate which is available under the tradenames GELCON F/140 and TERIC X7 Surfactant and a non-ionic surfactant/dispersant of the nonylphenol ethoxylate type available as TRITON N-101. Octylphenol ethoxylate stabilizes calcium nitrate in solution, and may be best described as stabilizer rather than wetting agent.

From various experiments it has been surprisingly found that in blends of glycerol and/or sorbitol with the sodium or potassium salt of alpha-hydroxypropionic acid, there is a synergistic effect enhancing the humectant property of each alone. This is marginally enhanced further by the addition of small quantities of other substances including a thickener such as sodium carboxymethyl cellulose, a binder such as a water-soluble polysaccharide and a non-ionic surfactant or wetting agent such as a nonyl phenol (9–15 mole) ethoxylate, calcium lignosulfonate.

Humectant formulations as described herein are preferably prepared in the form of concentrated solutions which can then be diluted with water on site. Humectants which function herein for the intended purposes include sorbitol, molasses, potassium lactate, sodium lactate, glycerol, potassium acetate and sodium acetate. Sorbitol is a well known readily available chemical. See e.g. Merck Index, 8th Edition, pg. 971.

An additional component of the formulation is a thickener, preferably Aqualon. Aqualon is a trademark of Hercules, Inc. of Wilmington, Del. Aqualon is a cellulose ether adhesive thickener. Other thickeners include hydroxy ethyl cellulose, carboxy methyl propyl cellulose, etc.

An additional component of the formulation is the binder, preferably Lignosite. Lignosite is a trademark of Georgia Pacific Corporation of Houston, Tex. Lignosite is a hygroscopic adhesive binder consisting of a wheaten or potato dextrin, or a calcium or sodium or ammonia salt of lignosulfonic acid.

An additional component of the formulation is the wetting agent Triton 101. Triton 101 is a trademark of the Rohm and Haas Corporation of Philadelphia, Pa. Triton 101 is a preferred chemical wetting agent or surfactant, a non-ionic surfactant compatible with the humectant and other components of the solutions described herein. Other wetting agents include Triton X100, Ninol II-CN, Igepal 60630, nonyl phenol ethoxylate 9–15 mole.

These components of the concentrated solution are utilized in parts per volume based on the total composition which includes (1) humectant from 25 to 75, (2) thickener from 0.2 to 1.5, (3) binder from 0.2 to 5, (4) wetting agent from 0.2 to 2.0 and (5) water 75 to 25.

A more specific preferred range includes (1) humectant 30 to 60, (2) thickener 0.2 to 0.5, (3) binder 0.2 to 5.0 (4) wetting agent 0.2 to 2.0, and (5) water 60 to 30.

The preferred example was mixed as follows:

EXAMPLE I

| Material | Parts by Volume |
| --- | --- |
| (1) Humectant, Sorbo Solution | 44.35 |
| (2) Thickener, Aqualon CMC-7LT | 0.36 |
| (3) Binder, Lignosite CX | 1.34 |
| (4) Wetting Agent, Triton N-101 | 0.60 |
| (5) Water | 53.38 |

Item 1 functions as a humectant. Items 2 and 3 are the thickener and the binder which have a secondary function in addition to enhancing the overall humectant action of the compound. The thickening and adhesive nature of these assists the anchoring of microthin coatings of the diluted compound to soil particles and plant root systems, reducing losses by migratory leaching during evaporation-induced capillary action. Item 5, the wetting agent, plays little or no part in the moisture-control function of the system. It aids wetting and penetration of soils which contain hydrophobic ingredients. For certain application, the wetting agent may be totally eliminated. The water makes the composition a liquid in concentrated form for being mixed with additional water on site for application.

These concentrates can then be formulated readily into aqueous solutions. The concentrate can be diluted with from about between 2 to 20 parts of water. The higher concentrations such as 2 to 1 are for plants with larger root structures such as trees. The lower concentrations such as 20 to 1 are for plants with smaller root structures such as grasses. The formulations ranges of the concentrated solutions are proportioned to the amount of water to dilute it.

The compound is best applied to soil surfaces, not directly to plant leaf systems. It may also be inserted into water reticulation/irrigation systems, by proportioning devices so as to be diluted to similar concentrations in sprinkler sprays or trickle feed systems. If in sprinklers, it is effective to stop the feed of compound prior to terminating a particular watering, in sufficient time for accumulated compound on plant leaves to be washed off into the soil where it is required.

Watering is preferably at rates between about 4 and 100 ml of the diluted solution per square meter. The higher rates are for plants with larger root structures such as trees. The lower rates are for grasses and other plants with smaller root structures such as grasses.

In soils treated with the improved solutions of the present invention, the amount of the compound is only a very small fraction of the mass of soil being tapped by the root systems of the plants. It has been found that the principal benefit to the plant is provided by the minute quantity of compound remaining in close contact with the hair fibers at the extremities of roots.

For example, in tests, thirty tomato seedlings 8 cm high were removed from their germination soil and had their roots washed clean before being re-planted in original soil with a measured moisture content of 18 percent by weight. Twenty were washed in water only and ten in a 10 percent dilution of the above formulation. Of the twenty water-washed seedlings, half were immediately re-planted in soil surface-watered with a similar 10 percent dilution of the invention. All other seedlings were watered with a similar quantity of water only. All were then left with no further watering for ten days.

Of the 10 with roots washed in the invention fluid, 8 survived. Of the 10 washed in water only, in plain soil, only 2 survived. Of the 10 likewise water-washed, but with the invention fluid added to the soil via initial surface-watering, 6 survived.

Similar experiments with other plant varieties gave generally similar results, with survival rates of plants being generally enhanced by 50 to 100 percent compared with similar plants in untreated soils.

It is evident that the fluid accumulated on root hairs is one of the factors in enhanced plant survival. Experiments with selectively-soluble tracer dyes indicate little if any of the compound is actually absorbed into the plant structure but remains around the root hairs or in the soil adjacent thereto.

The main function of the compound relates to its aforesaid property of maintaining constant humidity of air in contact with it. Thus, a micro-thin film of the compound around soil particles and root fibers, will have its dissolved moisture extracted by the powerful osmosis action of root fibers, effectively increasing the concentration of the compound vis a vis its remaining water. During the stated inhalation of air into the soil during a cooling phase, moisture will tend to be absorbed from the air by the compound, replacing that extracted by the plant system.

FIG. 1 shows in sectional view a plant in soil illustrating in dotted lines a normal cycle of moisture for watering such plant. In solid lines is an improved cycle of moisture for watering such plant.

Figure 2:
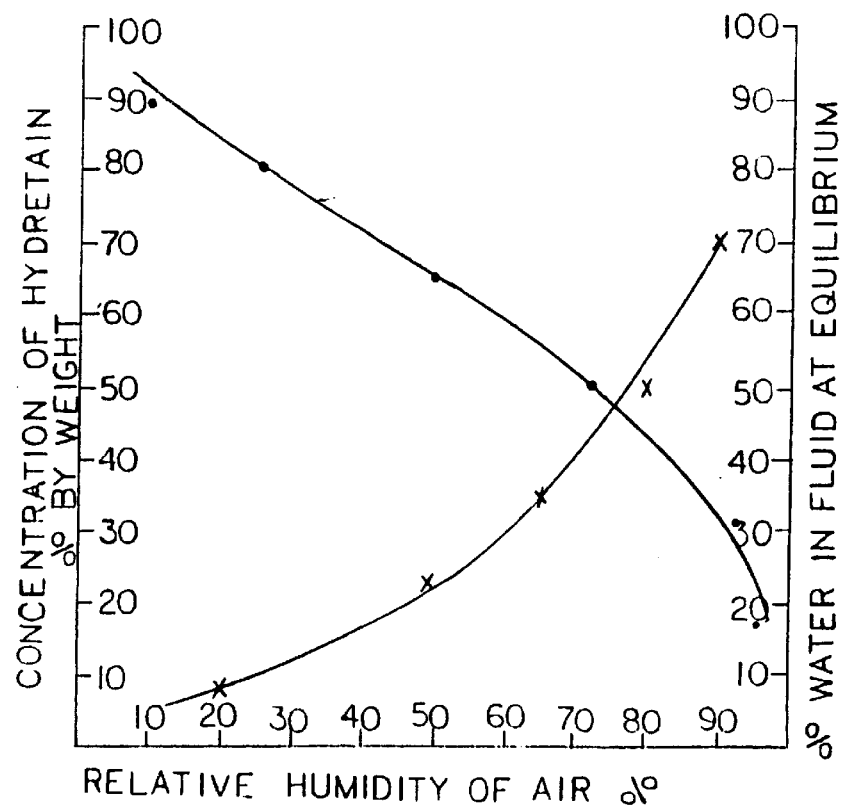
FIG. 2 is a graph illustrating the various characteristics of solutions prepared in accordance with the present invention.

FIG. 2 illustrates this effect at various humidities and concentrations of the humectant fluid with the negative curve, and also shows with the positive curve the hygroscopicity of the compound at different relative humidities.

For practical applications, the humectant may be a combination of humectants.

EXAMPLE II

| Material | Parts per Volume |
|---|---|
| 1A. Potassium lactate | 25 |
| 1B. Sorbitol | 10 |
| 2. Sodium carboxymethyl cellulose | 1.0 |
| 3. Calcium lignosulfonate | 1.5 |
| 4. Soya-amine ethoxylate | 0.0007 |
| 5. Water | 53 |

Low percentages of humectant are used in extremely high humidity areas.

The following are further examples:

EXAMPLE III

| Material | Parts by Volume |
|---|---|
| (1) Molasses | 50.0 |
| (1a) Other Humectant, Potassium Lactate | 20.0 |
| (2) Thickener, Hydroxy Ethyl Cellulose | 0.2 |
| (3) Binder, Lignosite | 30.0 |
| (4) Wetting Agent, Triton 101 | 0.0 |
| (5) Water | 9.8 |

Solutions without wetting agents include sandy, porous soils which are easily penetrated.

EXAMPLE IV

| Function | Material | Amount |
|---|---|---|
| humectant | potassium lactate | 60% 35 Kg |
|  | sorbitol | 195 Kg |
| binder | lignosite or |  |
|  | calcium lignosulfonate | 4 Kg |
| wetting agent | teric surfactant | 0.2 L |
| vehicle | water | (balance to make 200 L) |
| other | calcium nitrate | 48 Kg |
|  | lactic acid/KOH | to adjust pH to 6.0–6.5 |

EXAMPLE V

| Function | Material | Amount |
|---|---|---|
| humectant | Sorbitol | 270 Kg |
| wetting agent | GelCon F/140 | 0.4 L |
| vehicle | water | to make 400 L |
| other | Wafex Powder | 5.0 Kg |
| (to lower pH) | lactic acid | 10.5 Kg |
| (to raise pH) | caustic potash flake | as needed |
|  | calcium nitrate | 42 Kg |

EXAMPLE VI

| Function | Material | Amount |
|---|---|---|
| humectant | Sorbitol | 270 Kg |
| wetting agent | Teric X7 | 0.4 L |
| vehicle | water | to make 400 L |
| other | Wafex Powder | 5.0 Kg |
| (to lower pH) | lactic acid | 10.5 Kg |
| (to raise pH) | caustic potash flake | as needed |
|  | calcium nitrate | 42 Kg |

EXAMPLE VII

| Function | Material | Amount |
|---|---|---|
| humectant | Sorbo Solution | 120 lb. |
|  | potassium lactate 60% | 31 lb. |
| binder | Lignosite CX (GP) | 25 lb. |
| wetting agent | TRITON N-101 | 1.0 lb. |
| vehicle | water | 257.01 lb. |
| other | calcium nitrate | 42 lb. |

EXAMPLE IX

| Function | Material | Amount |
|---|---|---|
| humectant | potassium lactate 60% | 35 Kg |
|  | glycerol | 195 Kg |
| binder | lignosite or |  |
|  | calcium lignosulfonate | 4 Kg |
| wetting agent | teric surfactant | 0.2 L |
| vehicle | water | (balance to make 200 L) |
| other | calcium nitrate | 48 Kg |
|  | lactic acid/KOH | to adjust pH to 6.0–6.5 |

In Examples IV through IX, it has been found after repeated trials that formulations incorporating calcium nitrate show greatly improved economy of use, compared to earlier formulations using only sorbitol, potassium lactate, calcium lignosulfonate, and thickeners.

For example, trials of calcium nitrate versions on lawn grass, applied at 1 to 3 mls per square meter, gave extensions of watering intervals equal to the earlier compound applied at 10 to 20 mls per square meter, with proportionate economy of use. There appears to be a marked synergism between calcium nitrate and other components. It appears that the benefit of the new formulations is due to improved efficiency of plant root usage of available soil moisture in the vicinity of the plant roots. Tomato plants have shown a 45% increase in fruit yields, and broccoli has shown significant increases in edible yield.

EXAMPLE X

| Function | Material | Amount |
| --- | --- | --- |
| humectant | glycerol | 270 Kg |
| wetting agent | GelCon F/140 | 0.4 L |
| vehicle | water | to make 400 L |
| other | Wafex Powder | 5.0 Kg |
| (to lower pH) | lactic acid | 10.5 Kg |
| (to raise pH) | caustic potash flake | as needed |
| | calcium nitrate | 42 Kg |

EXAMPLE XI

| Funciton | Material | Amount |
| --- | --- | --- |
| humectant | potassium lactate 60% | 35 Kg |
| | sorbitol | 195 Kg |
| binder | calcium lignosulfonate | 4 Kg |
| lactic acid/ caustic potash | | to adjust pH to 4.5–6.5 |
| vehicle | water | (balance to make 300 L) |

EXAMPLE XII

| Function | Material | Amount |
| --- | --- | --- |
| humectant | glycerol | 250 Kg |
| | potassium lactate 60% | 35 Kg |
| binder | calcium lignosulfonate | 4 Kg |
| | calcium nitrate | 48 Kg |
| lactic acid/ caustic potash | | to adjust pH to 5.0–6.0 |
| vehicle | water | (balance to make 300 L) |

The results of formulations X through XII produced significant improvement in plant health and yield of edible plant matter when used to treat the soil surrounding various types of agricultural plants.

It is to be understood that this invention is not limited to the specific examples which have been offered as particular embodiments and that modifications can be made without departing from the spirit thereof.

Now that the invention has been described,

What is claimed is:

1. A liquid concentrate solution composition for improving plant root watering consisting essentially of an organic humectant, a binder, a wetting agent, and water in the following parts by volume:

(1) humectant from 25 to 75 parts by volume;
   (2) binder from 0.2 to 5 parts by volume;
   (3) wetting agent from 0.2 to 2.0 parts by volume; and
   (4) water from 75 to 25 parts by volume.

2. A liquid concentrate solution as in claim 1 comprising:

(1) humectant from 30 to 60 parts by volume;
   (2) binder from 0.2 to 5.0 parts by volume;
   (3) wetting agent from 0.2 to 2.0 parts by volume; and
   (4) water from 60 to 30 parts by volume.

3. A liquid concentrate solution as in claim 1, wherein the solution has a pH in the range of 5.0–6.0.

4. A liquid concentrate solution as in claim 1, further including calcium nitrate.

5. A method for improving watering of plant roots which comprises introducing the composition of claim 1 to the main root areas of the plant root.

6. A liquid concentrate solution composition for improving plant root watering consisting essentially of an organic humectant, a binder, and water in the following parts by volume:

(1) humectant from 25 to 75 parts by volume;
   (2) binder from 0.2 to 5 parts by volume; and
   (3) water from 75 to 25 parts by volume.

7. A method for improving watering of plant roots which comprises introducing the composition of claim 6 to the main root areas of the plant root.

8. A liquid concentrate solution composition for improving plant root watering comprising a organic humectant, a binder, a wetting agent, and water in the following parts by volume:

(1) humectant from 25 to 75 parts by volume;
   (2) binder from 0.2 to 5 parts by volume;
   (3) wetting agent from 0.2 to 2.0 parts by volume; and
   (4) water from 75 to 25 parts by volume.

9. A liquid concentrate solution as in claim 8, further including calcium nitrate.

10. A liquid concentrate solution as in claim 8, wherein the solution has a pH in the range of 5.0–6.0.

* * * * *